US008873063B2

(12) United States Patent
Sanders et al.

(10) Patent No.: US 8,873,063 B2
(45) Date of Patent: Oct. 28, 2014

(54) LOW NOISE RESONATOR FIBER OPTIC GYRO (75) Inventors: Glen A. Sanders, Scottsdale, AZ (US); Lee K. Strandjord, Tonka Bay, MN (US); Jianfeng Wu, Tucson, AZ (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 13/585,263

(22) Filed: Aug. 14, 2012

(65) Prior Publication Data
US 2014/0049780 A1 Feb. 20, 2014

(51) Int. Cl.
*G01C 19/72* (2006.01)

(52) U.S. Cl.
USPC .......................................... 356/461

(58) Field of Classification Search
CPC ...... G01C 19/72; G01C 19/723; G01C 19/64; G01C 19/68
USPC .......................... 356/461, 463, 467, 472, 475
See application file for complete search history.

(56) References Cited

U.S. PATENT DOCUMENTS

| 4,135,822 | A | 1/1979 | Ezekiel |
| 4,352,562 | A | 10/1982 | Minden |
| 4,702,600 | A | 10/1987 | Handrich et al. |
| 4,807,999 | A | 2/1989 | Soo Hoo |
| 4,863,272 | A | 9/1989 | Coccoli |
| 5,530,545 | A | 6/1996 | Pavlath |
| 5,682,241 | A | 10/1997 | Mark et al. |
| 6,763,153 | B2 | 7/2004 | Bennett |
| 6,765,678 | B2 | 7/2004 | Strandjord |
| 6,836,334 | B2 | 12/2004 | Bennett |
| 7,372,574 | B2 | 5/2008 | Sanders et al. |
| 2003/0081219 | A1 | 5/2003 | Bennett |
| 2003/0189710 | A1 | 10/2003 | Lo et al. |
| 2004/0061863 | A1 | 4/2004 | Digonnet |
| 2010/0290057 | A1 | 11/2010 | Qiu et al. |

FOREIGN PATENT DOCUMENTS

| JP | 2001324334 | 11/2001 |
| JP | 2002054930 | 2/2002 |

OTHER PUBLICATIONS

European Patent Office, "Office Action" from Foreign Counterpart of U.S. Appl. No. 11/298,439, Oct. 29, 2009, Published in: EP.
European Patent Office, "Extended European Search Report" from Foreign Counterpart of U.S. Appl. No. 11/298,439, mailed Mar. 4, 2009, Published in: EP.
Japan Patent Office, "Notification of Reasons for Rejection" from Foreign Counterpart of U.S. Appl. No. 11/298,439, Mailed Jun. 20, 2012, Published in: JP.

*Primary Examiner* — Jonathan Hansen
(74) *Attorney, Agent, or Firm* — Fogg & Powers LLC (57) ABSTRACT

A low-noise resonator fiber-optic gyroscope is provided. The low-noise resonator fiber-optic gyroscope includes at least one laser to output a reference optical beam, a first-optical-beam frequency controller to modulate the first optical beam at a first-modulation frequency, a second-optical-beam frequency controller to modulate the second optical beam at a second-modulation frequency to form a second-frequency-modulated optical beam, a fiber resonator having a counter-clockwise-input end configured to input the first-frequency-modulated optical beam and the clockwise-input end configured to input the second-frequency-modulated optical beam; a first-frequency demodulator to demodulate an optical beam output from the clockwise-input end of the fiber resonator; and a second-frequency demodulator to demodulate an optical beam output from the counter-clockwise-input end of the fiber resonator. The first-modulation frequency and the second-modulation frequency are adjusted so that sideband noise spectrum centered on the first and second modulation frequencies are from each other.

20 Claims, 5 Drawing Sheets

LOW NOISE RESONATOR FIBER OPTIC GYRO

BACKGROUND

Noise in gyroscopes limits the accuracy of navigation. The higher the noise, the longer the aircraft has to initialize its direction before flight and the greater the errors in position and velocity, especially when unaided by GPS. This is a problem for aircraft that are required to take off quickly in the event of an emergency, to keep air traffic on schedule, or for other reasons. In addition, position and velocity accuracy have to be maintained even in the absence of GPS aiding.

SUMMARY

The present application relates to a low-noise resonator fiber-optic gyroscope. The low-noise resonator fiber-optic gyroscope includes at least one laser configured to output a reference optical beam used to form at least a first optical beam and a second optical beam; a first-optical-beam frequency controller to modulate the first optical beam at a first-modulation frequency to form a first-frequency-modulated optical beam; a second-optical-beam frequency controller to modulate the second optical beam at a second-modulation frequency to form a second-frequency-modulated optical beam. At least one of the first-frequency-modulated optical beam and the second-frequency-modulated optical beam is frequency-shifted from the reference optical beam. The low-noise resonator fiber-optic gyroscope also includes a fiber resonator having a fiber resonator coil with a clockwise-input end and a counter-clockwise-input end. The counter-clockwise-input end is configured to input the first-frequency-modulated optical beam and the clockwise-input end is configured to input the second-frequency-modulated optical beam. The low-noise resonator fiber-optic gyroscope also includes a first-frequency demodulator to demodulate, at a first-demodulation frequency, an optical beam output from the clockwise-input end of the fiber resonator; and a second-frequency demodulator to demodulate, at a second-demodulation frequency, an optical beam output from the counter-clockwise-input end of the fiber resonator. The first-demodulation frequency equals the first-modulation frequency and the second-demodulation frequency equals the second-modulation frequency. The first-modulation frequency and the second-modulation frequency are adjusted with respect to each other so that, on the optical beams output from the fiber resonator: sideband noise spectrum centered on the first-modulation frequency is offset in frequency from the second-modulation frequency, and sideband noise spectrum centered on the second-modulation frequency is offset from the first-modulation frequency.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

The optical gyroscopes described herein are Low Noise Resonator Fiber Optic Gyros (LN-RFOG) and are designed to provide navigation grade performance. The bias drift (bias uncertainty) in a navigation grade performance gyroscope is between 0.001 and 0.01 degrees/hour and the noise (angle random walk) is typically between $0.0007°/\sqrt{hr}$ and $0.01°/\sqrt{hr}$. The gyro angle random walk (ARW) is a standard measure, in units of degrees per square root hour ($°/\sqrt{hr}$), of the noise in a fiber optic gyroscope. In order for the indicated rate of the gyro output to be characterized as having low ARW, many noise sources have to be minimized. These noise sources include electronics readout and signal processing noise, detector shot noise, laser light wave amplitude noise, and laser frequency noise. In the case of the effects of the latter two noise sources, it is fundamentally important that the optical light waves exiting the fiber resonator sensing coil have low amplitude fluctuations at detection frequencies from which rotation rate is derived. This imposes requirements that the light waves incident on the sensing coil have low noise, and that the noise in the optical beams that propagate within the optical fiber in the sensing coil is low. The terms "light wave", "wave", "optical beam", and "beam" are used interchangeably herein.

In one implementation of this embodiment, the fiber in the sensing coil has a length of less than 20 meters. In one implementation of this embodiment, the ARW noise is low when it is between $0.0007°/\sqrt{hr}$ and $0.007°/\sqrt{hr}$. When the ARW noise is at this level, the gyroscope provides navigation grade performance provided other characteristics of the gyro such as scale factor performance and bias stability are of sufficient quality.

For the optical gyroscopes described herein, the light source is low noise, single frequency laser with a high modulation bandwidth. The high modulation bandwidth permits the laser frequency to be changed quickly under the direction of an electrical control signal. A portion of the optical beam output from an intensity modulator is input to a RIN servo, which monitors the light output from the intensity modulator before it is introduced to the rotation-sensing fiber resonator. Intensity noise at a photo detector is servo'd out via a variable optical attenuator (also referred to herein as the intensity modulator). This reduction in intensity noise in the optical beam ensures there are very few detection sensitive sidebands on the optical beam are coupled to the fiber resonator coil. Detection sensitive sidebands are at the frequencies in which the detection system is used to derive rotation rate information. If detection sensitive sidebands were coupled into the fiber resonator coil, they would be frequency modulated (FM) with residual frequency noise to give sidebands at the modulation frequency of the resonator that is used to detect rotation rate.

If a single laser provides an optical beam to the fiber resonator coil, the optical beam is split into a first and second optical beam (or alternatively, the optical beam is split into a first, second, and third optical beam). The first and second optical beams are phase modulated. The first and second optical beams are modulated at a first-modulation frequency and second-modulation frequency, respectively. These modulation frequencies each produce a signal at the output of the resonator that is indicative of whether the average input beam frequency is centered on resonance. If the average light wave frequency of the first optical beam is at the resonator center frequency in its intended direction of propagation, there are no intensity fluctuation in the first optical beam at the first-modulation frequency when the first optical beam exits the resonator. In principle, the only fluctuations of the output beam, in that case, are at even harmonics of the first-modulation frequency. If the average frequency of the first optical beam is not matched to the center of the resonance, a light wave intensity fluctuation at the first-modulation frequency (the fundamental) is observed, indicative of the first beam being off resonance center.

Likewise, if the average light wave frequency of the second optical beam is at the resonator center frequency in its intended direction of propagation, there are no intensity fluctuations in the second optical beam at the second-modulation frequency when the second optical beam exits the resonator. In principle, the only fluctuations of the output beam, in that case, are at even harmonics of the first-modulation frequency. If the average frequency of the second optical beam is not matched to the center of the resonance, a light wave intensity fluctuation at the second-modulation frequency (the fundamental) is observed, indicative of the second beam being off resonance center.

The average frequency is each beam is then adjusted such that each light wave exiting the resonator has no fluctuation at the fundamental frequency of each modulation signal. The average frequency difference between the two light waves necessary to maintain this condition is a function of the rotation rate.

Several error sources, including gyro output noise, can give a false fluctuating indication of rotation rate. One error source is due to fluctuations in the input beam intensity of each beam that is at, or in a region about, its respective modulation frequency. To address this, RIN servos for each of the first and second optical beams remove any residual, unintended amplitude modulation that is either emitted or imparted to the first and second optical beams at, or near (for example, within 5 kHz), the modulation frequency of the respective first and second optical beams.

The RIN servos also remove intensity fluctuations near baseband (roughly less than 5 kHz), which cause any intensity difference between clockwise and counterclockwise beams to fluctuate, thus modulating the optical Kerr effect and causing gyro output noise.

Another error source is due to any backscattered light wave that propagates along a different path than the intended path. To address this, the systems and methods described herein set different modulation frequencies (and detection frequencies) for the clockwise beams and counterclockwise beams, so that, when light undesirably backscatters from one direction into the other, the backscattered light wave on the output detector is separated out or ignored by demodulating at the appropriate frequency of the intended signal light. The backscattered light is modulated at a different frequency. Since a backscattered light wave propagates along a different path than the intended path, this difference in modulation for the counter-clockwise (CCW) beam(s) and the clockwise (CW) beam(s) prevents rotation errors that would have occurred due to back scattering.

However, even if the backscattered light and the output detector signal (intended signal light) are modulated at different frequencies, if the separation between modulation frequencies is not large enough, there is frequency noise due to the backscattered wave incident on the output detector. Each input wave is smeared out in frequency (has FM sidebands) due to laser jitter and due to fluctuations in the path length between the laser and the resonator. This spreading of the light wave produces a sideband noise spectrum centered on the modulation frequency of each beam at the output of the resonator. The resonator converts frequency noise in the DC to 5 kHz frequency range to amplitude noise centered on the modulation frequency. The width of this spectrum produces sidebands on the backscattered light that is demodulated by the detector, even at a separate demodulation frequency if the modulation frequency difference is not sufficient.

Thus, the systems and methods described herein set different modulation frequencies (and detection frequencies) for the clockwise beams and counterclockwise beams, so that, the modulation frequencies of this embodiment are separated between the clockwise and counterclockwise beams, such that any sidebands on the backscattered light (from one beam into the other) are not inside the detection bandwidth (roughly +/−5 kHz about the modulation frequency) in each direction. The sideband noise spectrum is due to remaining frequency noise on the first, second, and third optical beams.

Additionally, to reduce any sideband signals from a backscattered light-wave, the RIN servos in each beam path are designed to eliminate (or greatly reduce) intensity modulation and intensity noise 1) in a region around the input beam's modulation frequency, 2) at the modulation frequencies of the other one or two beams, and 3) in at least +/−5 kHz region about the modulation frequency of the two or three beams. For instance, if a first beam is modulated at $f_m$, a second beam is modulated at $f_n$, and a third beam is modulated at $f_p$, the RIN servo in the path of the first beam is designed to not only attenuate intensity noise at, and around, its modulation frequency ($f_m$), but also at, and around the frequency modulation $f_n$ and $f_p$ of the second beam and the third beam, respectively. Such a system design prevents noise from light backscattered into CCW of the resonator (e.g., at $f_n$) from being demodulated in the CCW detector signal. In one implementation of this embodiment, intensity noise, which is attenuated at, or around, a given frequency, is attenuated within +/−5 KHz of the given frequency. In another implementation of this embodiment, intensity noise, which is attenuated at, or around, a given frequency, is attenuated within +/−7 KHz of the given frequency. The term "sideband noise spectrum centered on" is also applicable to other ranges of spectrum centered on the central frequency.

In this manner, the systems and methods described herein are designed to create a very clean noise spectrum with no backscattered content around each modulation frequency and detection frequency, thereby reducing the ARW noise of the gyro and providing low noise gyro operation.

Figure 1:
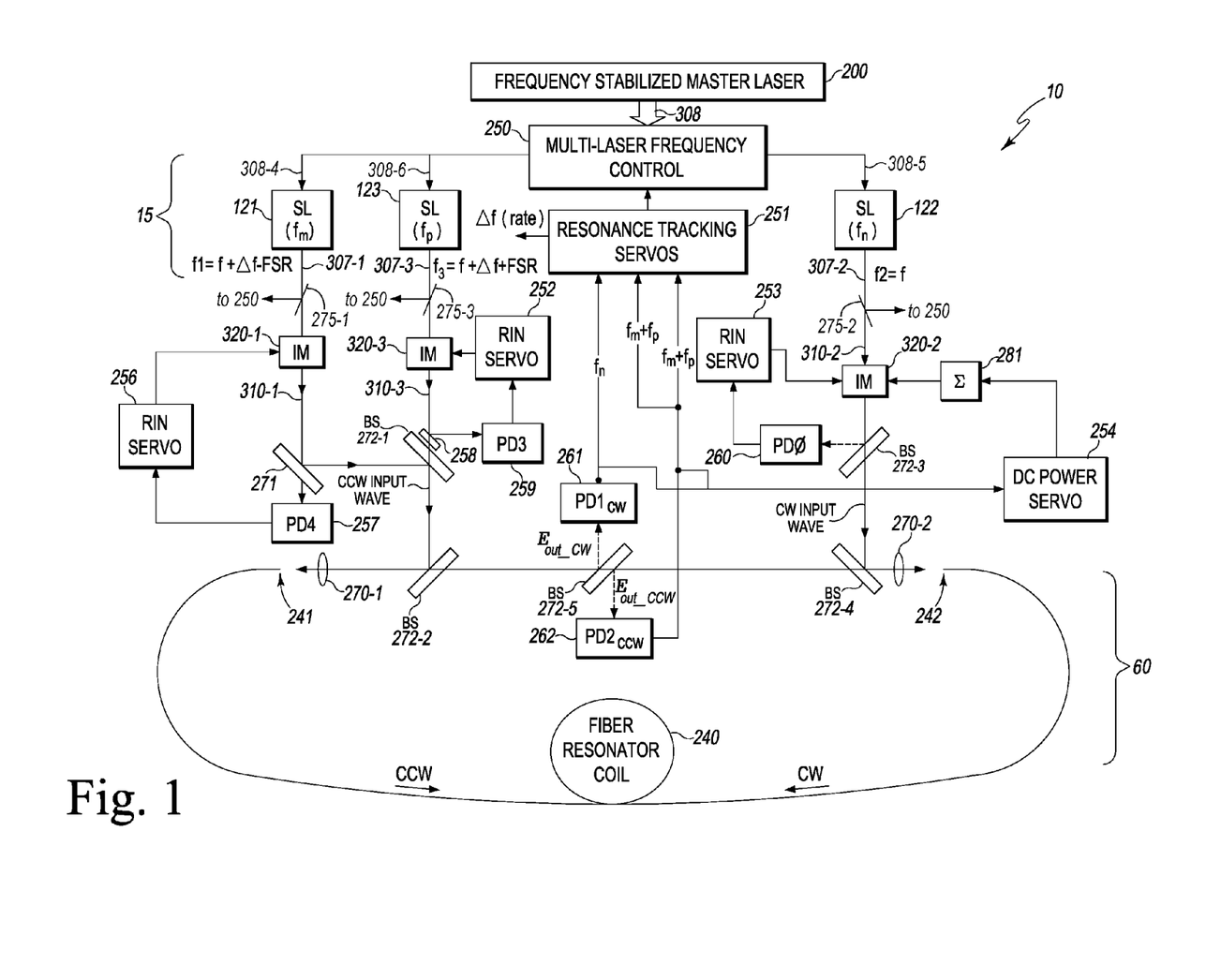
FIG. 1 is a block diagram of one embodiment of a low-noise resonator-fiber-optic gyroscope (RFOG) system in accordance with the present invention.

FIG. 1 is a block diagram of one embodiment of a compact low-noise resonator-fiber-optic gyroscope (RFOG) system in accordance with the present invention. The low-noise resonator fiber-optic gyroscope 10 includes a laser system 15 and a fiber resonator 60. The fiber resonator 60 includes the fiber resonator coil 240, input/output optics 272-2, 272-4, and 272-5, and coupling lenses 270-1 and 270-2. The laser system 15 includes a frequency stabilized master laser 200, a multi-laser frequency control 250, slave lasers 121, 122, and 123, and resonance tracking servos 251. The frequency stabilized master laser 200 is configured to output a reference optical beam 308. The "reference optical beam 308" is also referred to herein as a "master laser beam 308".

Figure 2:
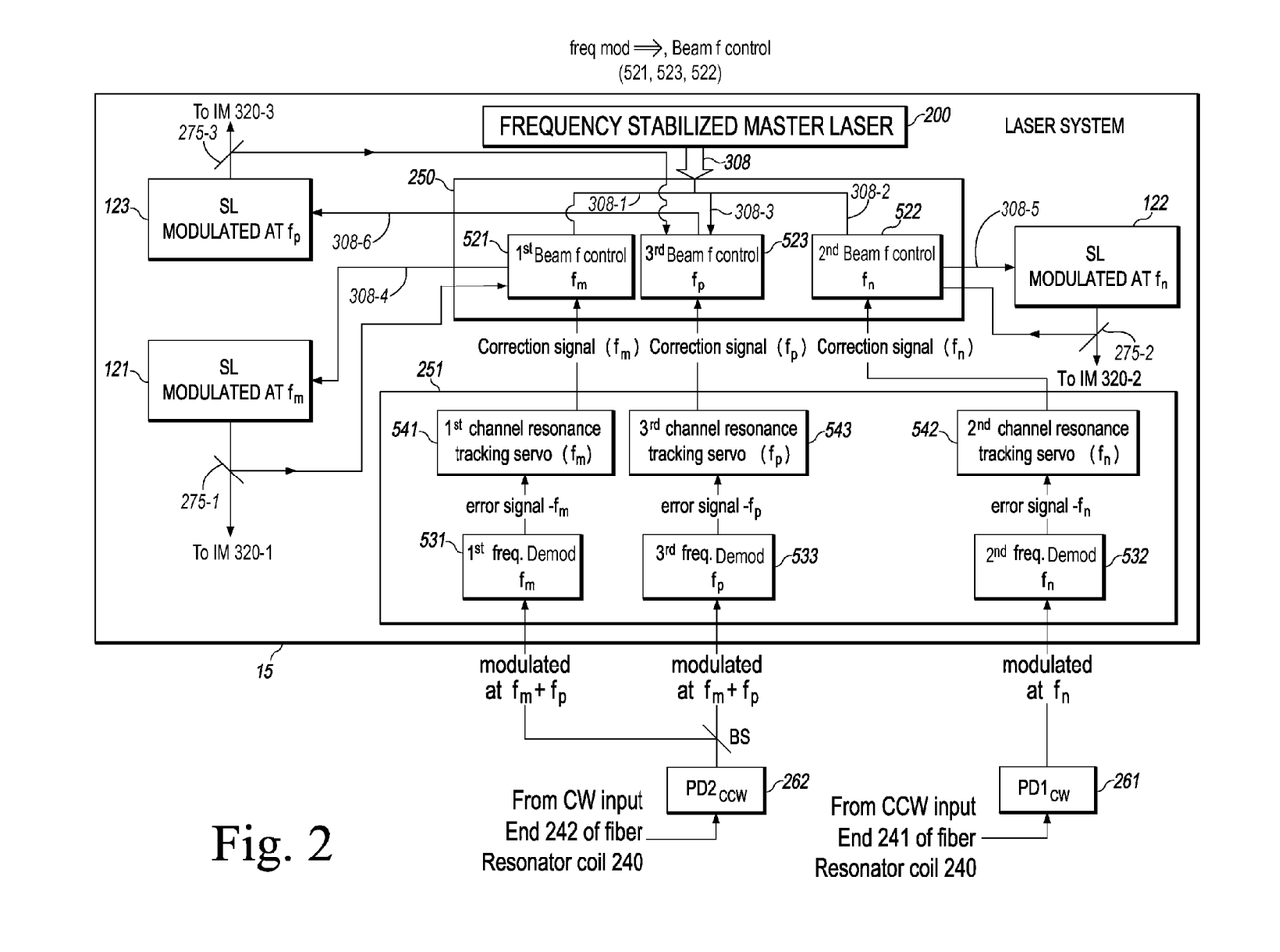
FIG. 2 is an expanded view of an embodiment of the laser system in FIG. 1 in accordance with the present invention.

FIG. 2 is an expanded view of an embodiment of the laser system 15 in FIG. 1 in accordance with the present invention. As shown in FIG. 2, the multi-laser frequency control 250 includes a first-optical-beam frequency controller (1$^{st}$ beam f control) 521, a second-optical-beam frequency controller ($2^{nd}$ beam f control) 522, and a third-optical-beam frequency controller ($3^{rd}$ beam f control) 523.

The first-optical-beam frequency controller 521 modulates the difference frequency between the reference optical beam 308-1 and the first-slave-laser optical beam 307-1 by providing a signal 308-4 that includes a first-modulation signal at frequency $f_m$. Signal 308-4 also includes a signal that sets the average difference in frequency between master laser beam 308-1 and first-slave-laser optical beam 307-1 (FIG. 1). The first-slave-laser optical beam 307-1 dithered at the first-modulation frequency $f_m$ is referred to herein as "first-frequency-modulated optical beam 307-1". The reference optical beam 308-1 has a center frequency $f_0$, and first-slave-laser optical beam 307-1 has a center frequency $f_1$. The center frequency $f_1$ is offset from the reference laser 308-1 center frequency $f_0$ by an amount governed by the average of a DC-coupled feedback signal, which is generated in the resonance tracking servo electronics 251 and the first-optical-beam frequency controller 521 within the multi-frequency laser control electro-optics 250. The signal 308-4 contains the feedback signal as well as the modulation signal at $f_m$. Thus, the first-frequency-modulated optical beam 307-1 is dithered at the dither frequency $f_m$ about its center frequency, $f_1$.

The second-optical-beam frequency controller 522 modulates the difference frequency between the reference optical beam 308-2 and the second-slave-laser optical beam 307-2 (FIG. 1) by providing a signal 308-5 that includes a second-modulation signal at frequency $f_n$. Signal 308-5 also includes a signal that sets the average difference in frequency ($\Delta f$) between master laser beam 308-2 and second-slave-laser optical beam 307-2. The second-slave-laser optical beam 307-2 dithered at the second-modulation frequency $f_n$, is referred to herein as "second-frequency-modulated optical beam 307-2". The reference optical beam 308-2 has a center frequency $f_0$, and second-slave-laser optical beam 307-2 has a center frequency $f_2$. The center frequency $f_2$ is offset from the reference laser 308-2 center frequency $f_0$ by an amount governed by the average of a DC-coupled feedback signal, which is generated in the resonance tracking servo electronics 251 and the second-optical-beam frequency controller 522 within the multi-frequency laser control electro-optics 250. The signal 308-5 contains the feedback signal as well as the modulation signal at $f_n$. Thus, the second-frequency-modulated optical beam 307-2 is dithered at the dither frequency $f_n$, about its center frequency, $f_2$.

The third-optical beam frequency controller 523 modulates the difference frequency between the reference optical beam 308-3 and the third-slave-laser optical beam 307-3 by providing a signal 308-6 that includes a third-modulation signal at frequency $f_p$. Signal 308-6 also includes a signal that sets the average difference in frequency ($\Delta f$) between master laser beam 308-3 and third-slave-laser optical beam 307-3 (FIG. 1). The third-slave-laser optical beam 307-3 dithered at the third-modulation frequency $f_p$ is referred to herein as "third-frequency-modulated optical beam 307-3". The reference optical beam 308-3 has a center frequency $f_0$, and third-slave-laser optical beam 307-3 has a center frequency $f_3$. The center frequency $f_3$ is offset from the reference laser 308-3 center frequency $f_0$ by an amount governed by the average of a DC-coupled feedback signal, which is generated in the resonance tracking servo electronics 251 and the third-optical-beam frequency controller 523 within the multi-frequency laser control electro-optics 250. The signal 308-6 contains the feedback signal as well as the modulation signal at $f_p$. Thus, the third-frequency-modulated optical beam 307-3 is dithered at the dither frequency $f_p$ about its center frequency, $f_3$.

As shown in FIG. 2, the resonance tracking servos 251 include a first-frequency demodulator 531, a first channel resonance tracking servo 541, a second-frequency demodulator 532, a second channel resonance tracking servo 542, a third-frequency demodulator 533, and a third channel resonance tracking servo 543.

The first-frequency demodulator 531 demodulates, at the first-demodulation frequency $f_m$, the optical beam output from the clockwise-input end 242 of the fiber resonator coil 240. The first-frequency demodulator 531 outputs error signals for the optical beam modulated at the first-modulation frequency $f_m$ to the first channel resonance tracking servo 541. The first channel resonance tracking servo 541 sends an output to the first-optical-beam frequency controller 521 in order to drive the first slave laser 121 with a correction signal for the beam modulated (dithered) at $f_m$. The correction signal for the beam modulated at $f_m$ adjusts the frequency output from the first slave laser 121 by the appropriate signal to adjust its average frequency to $f_1=f+\Delta f-FSR$ that is centered at the $(n-1)^{th}$ resonance frequency of the resonator, where n is an integer. The resonator free spectral range (FSR) is the frequency difference between the $(n+1)^{th}$ and $n^{th}$ resonance, and the frequency difference between the $n^{th}$ resonance and the $(n-1)^{th}$ resonance of the fiber resonator 60. The FSR is the frequency change of the light wave necessary to fit one more wavelength of light within the round-trip path length of the fiber resonator 60.

To be at resonance center in the presence of rotation rate, the frequencies of the CCW input light waves (e.g., first-frequency-modulated optical beam 307-1 and third-frequency-modulated optical beam 307-3) contain a frequency shift $\Delta f$ compared the clockwise (CW) light wave (e.g., second frequency-modulated optical beam 307-2). The magnitude and sign of $\Delta f$ are indicative of the magnitude and sign of the rotation rate of the fiber resonator 60 relative to inertial space.

The second-frequency demodulator 532 demodulates, at a second-demodulation frequency $f_n$, the optical beam output from the counter-clockwise-input end 241 of the fiber resonator coil 240. The second-frequency demodulator 532 outputs error signals for the optical beam modulated at the second-modulation frequency $f_n$ to the second channel resonance tracking servo 542. The second channel resonance tracking servo 542 sends an output to the second-optical-beam frequency controller 522 in order to drive the second slave laser 122 with a correction signal for the beam modulated (dithered) at $f_n$. The correction signal for the beam modulated at $f_n$ adjusts the frequency output from the second slave laser 122 to an average frequency $f_2=f$. The frequency f matches the center of the $n^{th}$ resonance of fiber resonator 60. The frequency f is thus the average frequency of the three light waves when the rotation rate, and thus $\Delta f$, is zero.

The third-frequency demodulator 533 demodulates, at a third-demodulation frequency $f_p$, the optical beam output from the clockwise-input end 242 of the fiber resonator coil 240. The third-frequency demodulator 533 outputs error signals for the optical beam modulated at the third-modulation frequency $f_p$ to the third channel resonance tracking servo 543. The third channel resonance tracking servo 543 sends an output to the third-optical-beam frequency controller 523 order to drive the third slave laser 123 with a correction signal for the beam modulated (dithered) at $f_p$. The correction signal for the beam modulated at $f_p$ adjusts the frequency output from the third slave laser 123 by the appropriate signal to adjust its average frequency to $f_3=f+\Delta f+FSR$ that is centered at the $(n+1)^{th}$ resonance frequency of the resonator, where n is an integer.

The first-demodulation frequency $f_m$ equals the first-modulation frequency $f_m$, the second-demodulation frequency $f_n$ equals the second-modulation frequency $f_n$, and the third-demodulation frequency $f_p$ equals the third-modulation frequency $f_p$.

The first-modulation frequency $f_m$ and the second-modulation frequency $f_n$ are adjusted with respect to each other so that sideband noise spectrum, on the optical beam output from the fiber resonator, centered on the first-modulation frequency of the first-frequency-modulated-optical-beam is offset in frequency from the second-modulation frequency of the second-frequency-modulated-optical-beam. Likewise, sideband noise spectrum on the optical beams output from the fiber resonator centered on the second-modulation frequency of second-frequency-modulated-optical-beam is offset from the first-modulation frequency of the first-frequency-modulated-optical-beam.

Specifically, the sideband noise spectrum centered on $f_m$ of the first-frequency-modulated optical beam 307-1 is offset from the second-demodulation frequency $f_n$ of the second-frequency-modulated optical beam 307-2 (FIG. 1). The first-modulation frequency $f_m$ and the second-modulation frequency $f_n$ are also adjusted with respect to each other so that the sideband noise spectrum centered on $f_n$ of the second-frequency-modulated optical beam 307-2 is offset from the first-demodulation frequency $f_m$ of the first-frequency-modulated optical beam 307-1 (FIG. 1). In one implementation of this embodiment, sideband noise spectrum centered on a modulation frequency is within +/−5 KHz of the modulation frequency. In another implementation of this embodiment, sideband noise spectrum centered on a modulation frequency is within +/−7 KHz of the modulation frequency. The term "sideband noise spectrum centered on" is also applicable to other ranges of sideband noise spectrum centered on the center frequency.

Similarly, the first-modulation frequency $f_m$ and the third-modulation frequency $f_p$ are adjusted with respect to each other so that sideband noise spectrum centered on $f_m$ of the first-frequency-modulated optical beam 307-1 is offset from the third-demodulation frequency $f_p$ of the third-frequency-modulated optical beam 307-3 (FIG. 1). The first-modulation frequency $f_m$ and the third-modulation frequency $f_p$ are also adjusted with respect to each other so that the sideband noise spectrum centered on $f_p$ of third-frequency-modulated optical beam 307-3 is offset from the first-demodulation frequency $f_m$ of the first-frequency-modulated optical beam 307-1 (FIG. 1).

Likewise, the second-modulation frequency $f_n$, and the third-modulation frequency $f_p$ are adjusted with respect to each other so that sideband noise spectrum centered on $f_n$ of second-frequency-modulated optical beam 307-2 is offset from the third-demodulation frequency $f_p$ of the third-frequency-modulated optical beam 307-3 (FIG. 1). The second-modulation frequency $f_n$, and the third-modulation frequency $f_p$ are also adjusted with respect to each other so that the sideband noise spectrum centered on $f_p$ of third-frequency-modulated optical beam 307-3 is offset from the second-demodulation frequency $f_p$ of the modulated second-frequency-modulated optical beam 307-2.

The counter-clockwise-input end 241 of the fiber resonator coil 240 is configured to input the first-frequency-modulated optical beam 310-1 and the clockwise-input end 242 of the fiber resonator coil 240 is configured to input a second-frequency-modulated optical beam 310-2. The length of the fiber resonator is set by the round-trip distance of the light traveling around the resonator 60, e.g., from the counter-clockwise-input end 241, through the fiber resonator coil 240, out clockwise-input end 242, and back to counter-clockwise-input end 241.

The operation of the low-noise resonator-fiber-optic gyroscope (RFOG) 10 is now described with reference to FIG. 1. The RFOG 10 includes a frequency stabilized master laser 200, three slave lasers (SL) 121, 122, and 123, three respective intensity modulators (IM) 320-1, 320-2, and 320-3, and a fiber resonator coil 240. The fiber resonator coil 240, combined with optical elements 272-2, 272-4, 272-5, 270-1, 270-2 and the free-space path length between fiber ends 241 and 242 is an optical fiber ring resonator 60 that forms a fiber ring resonant cavity in the gyroscope.

The fiber resonator coil 240 is also referred to herein as "fiber loop 240" and is part of the sensing resonator 60. The "sensing resonator 60" is also referred to herein at "optical fiber resonator 60" or "fiber resonator 60". The fiber loop 240 is the optical fiber coil through which at least two optical beams counter-propagate. The output of the sensing resonator 60 is used to determine the rate of rotation of the RFOG 10. In one implementation of this embodiment, there are only two respective slave lasers 121 and 122. In another implementation of this embodiment, the master laser 200 and the three slave lasers (SL) 121, 122, and 123 are semiconductor laser diodes.

The frequency stabilized master laser 200 emits a reference optical beam 308. The reference optical beam 308 is a stable optical reference frequency used to: 1) stabilize the three slave lasers 121, 122, 123 with respect to each other by providing a common reference so that there is no relative frequency jitter between them; 2) produce controlled, independent dithers about the center of resonance by respective frequency modulations of $f_m$, $f_n$, or $f_p$ on the optical beams 307-1, 307-2, 307-3 output from respective slave lasers 121, 122, and 123; and 3) provide a stable reference frequency relative to the fiber resonator 60. In one implementation of this embodiment, the reference optical beam 308 has low phase noise (e.g., less than 1 Hz/√Hz). The reference optical beam 308 is used to generate radio frequency (RF) beat signals between the master and slave lasers, which are used by phase locked loops (PLLs) that are included within the multi-frequency laser control 250 (referred to herein as "multi-laser frequency control 250") to lock the slave lasers 121, 122, and 123 to the master laser 200 with frequency separations determined by the resonance tracking servos 251 and the multi-frequency laser control 250. These beat signals are used by multi-laser frequency control 250, which receives feedback (i.e., correction signals) from resonance tracking servos 251, to precisely control the frequency of the optical beams of the slave lasers 121, 122, and 123.

As shown in FIG. 1, the first slave laser 121 is locked to and shifted with reference to the master-laser frequency $f_0$ of the reference optical beam 308-1 via signal 308-4 such that first slave laser 121 emits light at a first frequency $f_1 = f + \Delta f - FSR$, where f is related to the central frequency $f_0$ of master laser 200, $\Delta f$ is a frequency offset from the frequency f due to the rotation rate of the fiber resonator 60, and the FSR is the free spectral range of the fiber resonator 60. The free spectral range (FSR) is the frequency separation between adjacent resonance peaks of the fiber resonator 60. The frequency f is locked to a fixed offset $f_{off}$ from the master-laser frequency $f_0$ such that $f = f_0 + f_{off}$. The second slave laser 122 is locked to and shifted with reference to the master-laser frequency $f_0$ of the reference optical beam 308-2 via signal 308-5 such that second slave laser 122 emits light at a second frequency $f_2 = f$. The third slave laser 123 is locked to and shifted with reference to the master-laser frequency $f_0$ of the reference optical beam 308-3 via signal 308-6 such that third slave laser 123 emits light at a third frequency $f_3=f+\Delta f+FSR$. The slave laser input signals 308-4, 308-5 and 308-6 control each laser frequency by changing each slave laser's path length. For example, slave laser input signals 308-4, 308-5 and 308-6 are operable to change: the injection current to the slave laser; the temperature of the slave laser; the strain on the slave laser; or any combination thereof.

The optical beams 307-1, 307-2, and 307-3 are coupled into respective intensity modulators 320-1, 320-2, and 320-3. A portion of the respective optical beams 307-1, 307-2, and 307-3 are split by respective beam splitters 275-1, 275-2, and 275-3 to be fed back to the respective first-optical-beam frequency controller 521, a second-optical-beam frequency controller 522, and a third-optical-beam frequency controller 523. The beam splitters 275-1, 275-2, and 275-3 are positioned between the respective slave lasers 121, 122, and 123 and the respective intensity modulators 320-1, 320-2, and 320-3.

Low-noise, coherent optical beams 310-1, 310-2, and 310-3 are output from the respective intensity modulators 320-1, 320-2, and 320-3.

The fiber resonator coil 240 (fiber loop 240) is an optical fiber that has the counter-clockwise-input end 241 and the clockwise-input end 242 represented generally at 242. The counter-clockwise-input end 241 is also referred to herein as "first coil end-face 241". The clockwise-input end 242 is also referred to herein as "second coil end-face".

The first-low-noise-coherent optical beam 310-1 and the third-low-noise-coherent optical beam 310-3 are coupled to the counter-clockwise-input end 241 of the fiber resonator coil 240 from the respective intensity modulators 320-1 and 320-3. The second-low-noise-coherent optical beam 310-2 is coupled to the clockwise-input end 242 of the fiber resonator coil 240 from the intensity modulator 320-2.

The first-frequency-modulated optical beam 307-1 emitted from the first slave laser 121 is coupled (via the intensity modulator 320-1 and optical elements including beam splitters 271, 272(1-2) and lens 270-1) to the counter-clockwise-input end 241 of the fiber resonator coil 240. Other coupling configurations of optical elements are possible as is understandable to one skilled in the art. The portion of the optical beam 310-1 coupled into the fiber resonator coil 240 at the counter-clockwise-input end 241 propagates through the fiber resonator coil 240 in a counter-clockwise (CCW) direction.

The second-frequency-modulated optical beam 307-2 emitted from the second slave laser 122 is coupled (via the intensity modulator 320-2 and optical elements including beam splitters 272(3-4) and lens 270-2) to the second coil end-face 242 of the fiber resonator coil 240. The portion of the optical beam 310-2 coupled into the fiber resonator coil 240 at the second coil end-face 242 propagates through the fiber resonator coil 240 in a clockwise (CW) direction. The beam splitters 272-2 and 272-4 are the input coupling elements of the optical fiber resonator 60 for coupling light into fiber resonator, and are configured have low reflectivity and high transmission, so that most of the light exiting fiber end 242 is coupled to fiber end 241, and most of the light exiting fiber end 241 is coupled into fiber end 242.

The third-frequency-modulated optical beam 307-3 emitted from the third slave laser 123 is coupled (via the intensity modulator 320-3 and optical elements including the beam splitters 272(1-2) and lens 270-1) to the counter-clockwise-input end 241 of the fiber resonator coil 240. The portion of the optical beam 310-3 coupled into the fiber resonator coil 240 at the counter-clockwise-input end 241 propagates through the fiber resonator coil 240 in a counter-clockwise (CCW) direction. In one implementation of this embodiment, the lenses 270(1-2) are ball lenses that a positioned in a v-groove of a substrate, such as a silicon substrate.

The light coupled into the fiber resonator coil 240 circulates multiple times within the fiber resonator coil 240 by transit through the lenses 270-1 and 270-2 and the beam splitters 272-2, 272-5, and 272-4. A portion (e.g., 1 to 20%) of the light propagating in the clockwise (CW) direction is reflected by beam splitter 272-5 into the detector (PD $1_{CW}$) 261. A portion (e.g., 1 to 20%) of the light propagating in the counter-clockwise (CCW) direction is reflected by beam splitter 272-5 into the detector (PD2$_{CCW}$) 262. Information indicative of the amount of optical power detected at the detectors 261 and 262 is sent as signals to the resonance tracking servos 251 and to the DC power servo 254. The signal from detector 262 is split into two signals to be input to the resonance tracking servos 251. The resonance tracking servos 251 send signals to the multi-laser frequency control 250, which adjusts the frequency of the optical beams of the slave lasers 121, 122, and 123, as needed, to the resonance peaks of the sensing resonator 60. The DC power servo 254 sends signals to the summation circuit ($\Sigma$) 281 to adjust the power of the optical beam 310-2 output from the intensity modulator 320-2. This adjustment is done in order to balance the power in CW and CCW direction so that optical Kerr effect induced cavity optical path length difference is minimized.

The exemplary RFOG 10 shown in FIG. 1 includes a relative intensity noise (RIN) detector (PD4) 257 that receives a portion (e.g., 1 to 10%) of the optical beam 310-1 from the intensity modulator 320-1. RIN detector 257 measures the intensity noise of the optical beam 310-1 (before it is combined with beam 310-3) that is being input to the counter-clockwise-input end 241 of the fiber resonator coil 240. The RIN signal from the RIN detector 257 provides signal feedback to a RIN servo electronic system 256 (also referred to herein as a "first-relative-intensity-noise servo 256"). The electronic signal sent to the intensity modulator 320-1 from the RIN servo electronic system 256 adjusts the total light intensity of the input optical beam 310-1 passing through the intensity modulator 320-1, so that the undesirable fluctuations in intensity due to RIN are eliminated or substantially reduced. In this manner, the RIN servo loop is used to reduce the intensity noise or unwanted intensity or amplitude modulation of the input optical beam 310-1 passed through intensity modulator 320-1.

The exemplary RFOG 10 shown in FIG. 1 also includes a RIN detector (PD0) 260 that receives a portion (e.g., 1 to 10%) of the optical beam 310-2 from the intensity modulator 320-2. The RIN signal from the RIN detector 260 provides signal feedback to a RIN servo electronic system 253 (also referred to herein as a "second-relative-intensity-noise servo 253"). The electronic signal sent to the intensity modulator 320-2 from the RIN servo electronic system 253 adjusts the total light intensity of the input optical beam 310-2 passing through the intensity modulator 320-2, so that the undesirable fluctuations in intensity due to RIN are eliminated or substantially reduced. In this manner, the RIN servo loop is used to reduce the intensity noise or unwanted intensity or amplitude modulation of the input optical beam 310-2 passed through intensity modulator 320-2.

The exemplary RFOG 10 shown in FIG. 1 also includes a relative intensity noise (RIN) detector (PD3) 259 that receives a portion (e.g., 1 to 10%) of the optical beam 310-3 from the intensity modulator 320-3 via beam splitter 258. RIN detector 259 measures the intensity noise of the optical beam 310-3

(before it is combined with the optical beam 310-1) that is being input to the counter-clockwise-input end 241 of the fiber resonator coil 240. The RIN signal from the RIN detector 259 provides signal feedback to a RIN servo electronic system 252 (also referred to herein as a "third-relative-intensity-noise servo 252"). The electronic signal sent to the intensity modulator 320-3 from the RIN servo electronic system 252 adjusts the total light intensity of the input optical beam 310-3 passing through the intensity modulator 320-3, so that the undesirable fluctuations in intensity due to RIN are eliminated or substantially reduced. In this manner, the RIN servo loop is used to reduce the intensity noise or unwanted intensity or amplitude modulation of the input optical beam 310-3 passed through intensity modulator 320-3.

In this manner, the first-relative-intensity-noise servo 256 positioned at the counter-clockwise-input end 241 of the fiber resonator 240 reduces amplitude noise in the first-frequency-modulated optical beam 310-1 and the second-relative-intensity-noise servo 253 positioned at the clockwise-input end 242 of the fiber resonator 240 reduces amplitude noise in the second-frequency-modulated optical beam 310-2. Likewise, the third-relative-intensity-noise servo 252 positioned at the counter-clockwise-input end 241 of the fiber resonator 240 reduces amplitude noise in the third-frequency-modulated optical beam 310-3.

The first-relative-intensity-noise servo 256, the second-relative-intensity-noise servo 253, and the third-relative-intensity-noise servo 252 remove frequencies at the first-modulation frequency $f_m$, the second-modulation frequency $f_n$, the third-modulation frequency $f_p$. In some cases, where the RIN is high and the demodulators are susceptible to rectification of higher harmonics of the modulation frequencies, it is desirable have the RIN servos have sufficiently high bandwidth to remove RIN at the first several odd harmonics of the first-modulation frequency $f_m$, the first several odd harmonics of the second-modulation frequency $f_n$, and the first several odd harmonics of the third-modulation frequency $f_p$.

The first-relative-intensity-noise servo 256, the second-relative-intensity-noise servo 253, and the third-relative-intensity-noise servo 252 also remove intensity fluctuations at frequencies between DC (direct current) and 5 kHz. In this manner, the gyro angle random walk for the low-noise resonator fiber-optic gyroscope 10, which includes the laser system 15, is well below the gyro angle random walk for a prior art fiber-optic gyroscope.

Figure 3:
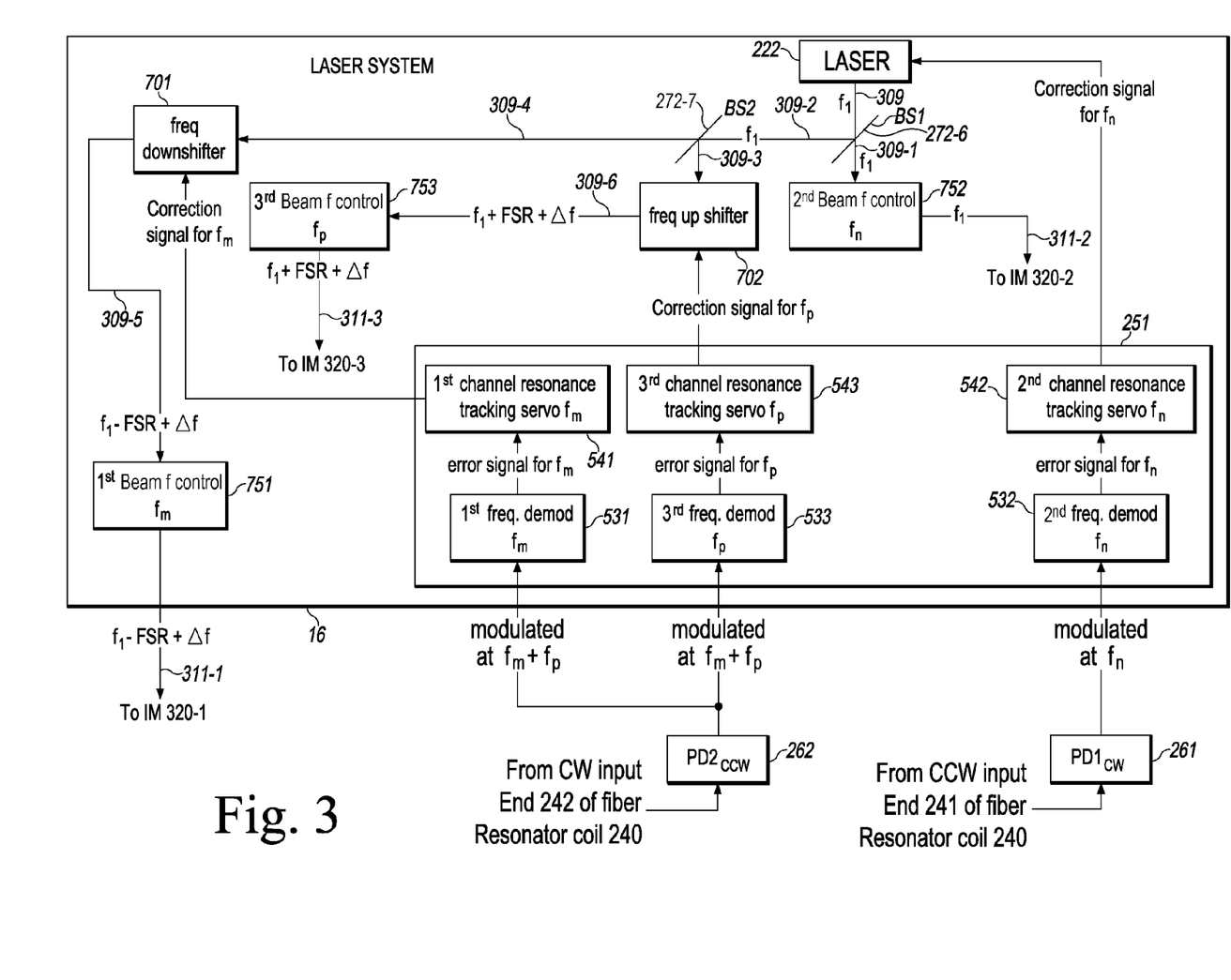
FIG. 3 is an expanded view of an embodiment of a laser system in accordance with the present invention.

FIG. 3 is an expanded view of an embodiment of a laser system in accordance with the present invention. In one implementation of the low-noise resonator fiber-optic gyroscope 10 shown in FIG. 1, laser system 16 replaces laser system 15. Laser system 16 differs from laser system 15 of FIGS. 1 and 2 in that the frequency stabilized master laser 200 and the slave lasers 121, 122, and 123 are replaced by a single laser 222. The laser 222 emits a reference optical beam 309 at a master laser frequency $f_1$. The master laser frequency $f_1$ is also referred to herein as "reference frequency $f_1$". The reference optical beam 309 is split into two optical beams 309-1 and 309-2 by beam splitter 272-6. The optical beam 309-1 is transmitted by the beam splitter 272-6 to a second-optical-beam frequency controller 752. The second-optical-beam frequency controller 752 frequency modulates the optical beam 309-1 at the frequency $f_n$ and outputs an optical beam 311-2 to the intensity modulator (IM) 320-2 (FIG. 1). The modulated-second optical beam 311-2 has a center frequency of $f_1$ and is modulated at a rate $f_n$. The modulated-second optical beam 311-2 is referred to herein as "second-frequency-modulated optical beam 311-2".

The optical beam 309 reflected by the beam splitter 272-6 as optical beam 309-2 is incident on beam splitter 272-7. The optical beam 309-2 is split into two optical beams 309-3 and 309-4 by beam splitter 272-7.

The optical beam 309-4 is transmitted through beam splitter 272-7 to a frequency down shifter 701. The frequency down shifter 701 outputs an optical beam 309-5, which has a frequency of $(f_1-FSR+\Delta f)$. The optical beam 309-5 is input to a first-optical-beam frequency controller 751. The first-optical-beam frequency controller 751 modulates the frequency of the first optical beam 309-5. The first-optical-beam frequency controller 751 frequency modulates the optical beam 309-5 at the frequency $f_m$ and outputs a modulated-downshifted-first optical beam 311-1 to the intensity modulator (1M) 320-1 (FIG. 1). The modulated-downshifted-first optical beam 311-1 has a center frequency of $(f_1-FSR+\Delta f)$ and is frequency modulated at a rate of $f_m$. The modulated-downshifted-first optical beam 311-1 is referred to herein as "first-frequency-modulated optical beam 311-1".

The optical beam 309-3 is reflected by beam splitter 272-7 to a frequency up shifter 702. The frequency up shifter 702 outputs an optical beam 309-6, which has a frequency of $(f_1+FSR+\Delta f)$. The optical beam 309-6 is input to a third-optical-beam frequency controller 753. The third-optical-beam frequency controller 753 frequency modulates the optical beam 309-6 at the frequency $f_p$ and outputs an optical beam 311-3 to the intensity modulator (IM) 320-3 (FIG. 1). The modulated-upshifted-third optical beam 311-3 has a center frequency of $(f_1+FSR+\Delta f)$ and is modulated at $f_p$. The modulated-upshifted-third optical beam 311-3 is referred to herein as "third-frequency-modulated optical beam 311-3".

The optical beams 311-1, 311-2, and 311-3 are processed by a low-noise resonator fiber-optic gyroscope in the same manner as the optical beams 307-1, 307-2, and 307-3 are processed by the low-noise resonator fiber-optic gyroscope 10 shown in FIG. 1 except for the following difference. In the resonance tracking servos 251: the first channel resonance tracking servo 541 sends correction signals for the first channel at $f_m$ to the frequency down-shifter 701; the second channel resonance tracking servo 542 sends correction signals for the second channel at $f_n$ to the laser 222; and the third channel resonance tracking servo 543 sends correction signals for the third channel at $f_p$ to the frequency up-shifter 702.

Specifically, the first channel resonance tracking servo 541 sends an output to the frequency down shifter 701 in order to drive the frequency down shifter 701 with a correction signal for the beam modulated (dithered) at $f_m$. The correction signal for the beam modulated at $f_m$ adjusts the frequency output from the frequency down shifter 701 such that its average frequency $f_1+\Delta f-FSR$ is centered at the $(n-1)^{th}$ resonance frequency of the resonator 60, where n is an integer. To be at resonance center in the presence of rotation rate, the frequencies of the CCW input light waves 311-1 and 311-3 contain a frequency shift $\Delta f$ compared the CW light wave 311-2. The magnitude and sign of $\Delta f$ are indicative of the magnitude and sign of the rotation rate of the fiber resonator 60 relative to inertial space.

Likewise, the third channel resonance tracking servo 543 sends an output to the frequency up shifter 702 in order to drive the frequency up shifter 702 with a correction signal for the beam modulated (dithered) at $f_p$. The correction signal for the beam modulated at $f_p$ adjusts the frequency output from the frequency up shifter 702 such that its average frequency $f_1+\Delta f+FSR$ is centered at the $(n+1)^{th}$ resonance frequency of the resonator 60, where n is an integer.

The second channel resonance tracking servo 542 sends a correction signal to the laser 222 in order to drive the laser 222 with a correction signal for the beam modulated (dithered) at $f_n$. The correction signal for the beam modulated at $f_n$, adjusts the frequency of the beam emitted from the laser 222 by the appropriate amount so the optical beam 309 emitted from the laser 222 has an average frequency $f_1$ that is centered at the $(n)^{th}$ resonance frequency of the resonator 60, where n is an integer. In this manner, the frequency $f_1$ of the optical beam being emitted from the laser 222 is matched to the CW frequency of the fiber resonator 60 by the correction signals output from the second channel resonance tracking servo 542 to the laser 222. The optical beam 309-5 emitted by the frequency down shifter 701 and the optical beam 309-6 emitted by the frequency up shifter 702 include the Δf term so they are on resonance to the CCW frequency of the of the fiber resonator 60.

In this manner, the gyro angle random walk for a low-noise resonator fiber-optic gyroscope having the laser system 16 is well below the gyro angle random walk for a prior art fiber-optic gyroscope.

Figure 4A:
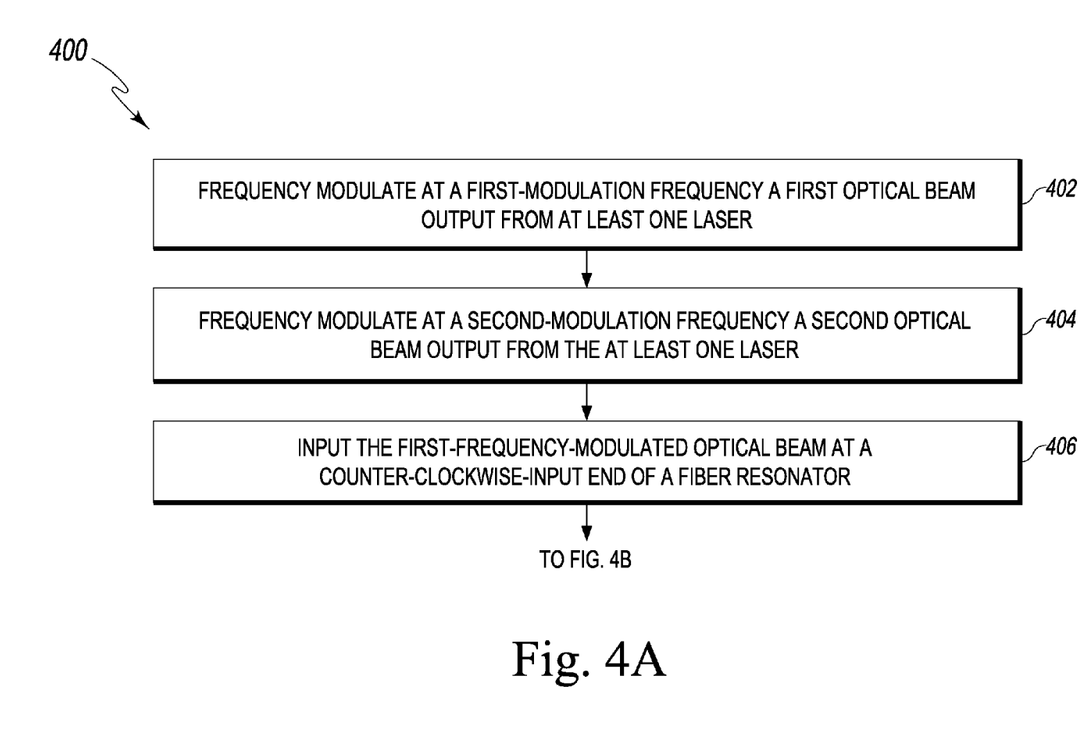
FIGS. 4A and 4B are flow diagrams of one embodiment of a method to reduce gyro angle random walk from a ring laser gyroscope in accordance with the present invention.
Figure 4B:
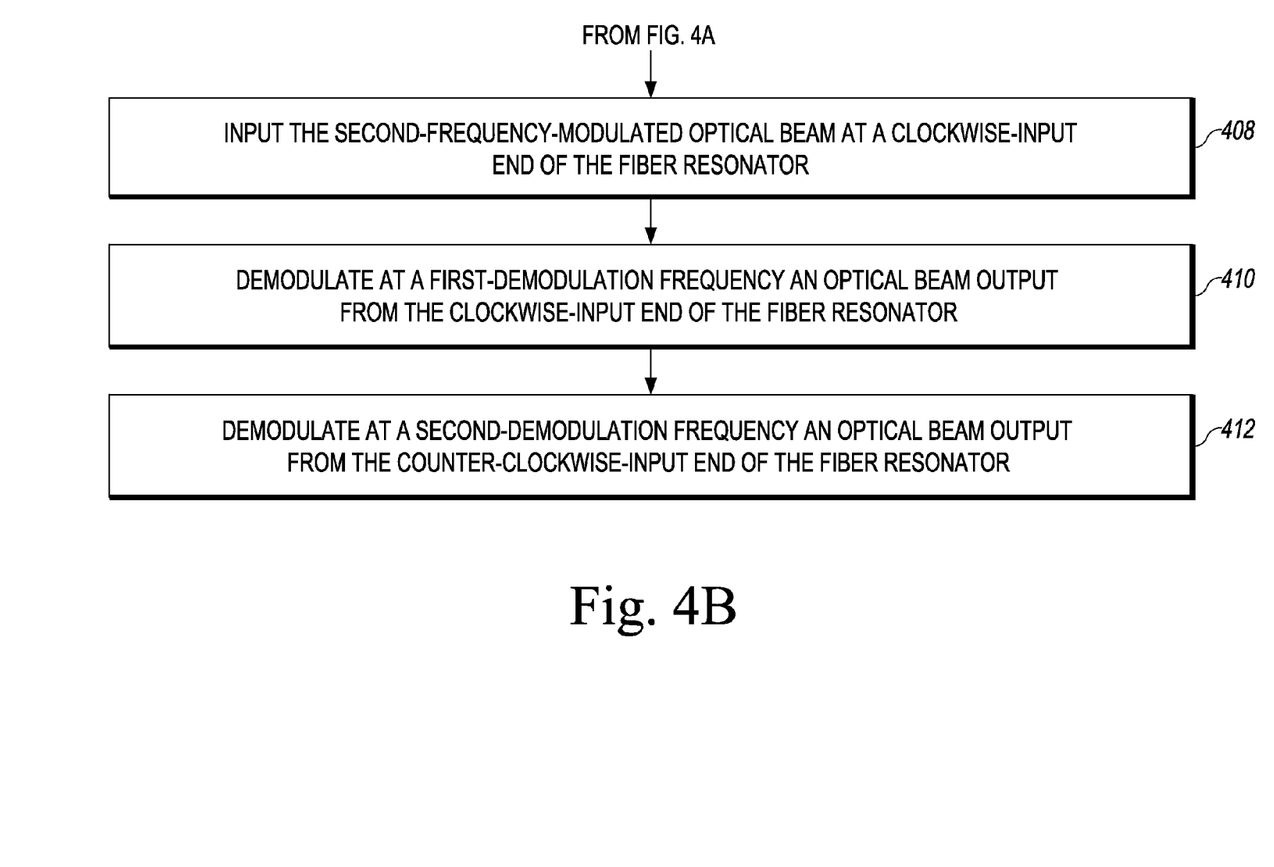

FIGS. 4A and 4B are flow diagrams of one embodiment of a method 400 to reduce gyro angle random walk of a resonator fiber-optic gyroscope in accordance with the present invention. The resonator fiber-optic gyroscope can be resonator fiber-optic gyroscope 10 of FIG. 1. In one implementation of this embodiment, resonator fiber-optic gyroscope implemented in method 400 is a resonator fiber-optic gyroscope in which the laser system 15 of FIG. 1 is replaced by the laser system 16 of FIG. 3.

At block 402, a first optical beam output from at least one laser is frequency modulated at a first-modulation frequency to form a first-frequency-modulated optical beam.

At block 404, a second optical beam output from the at least one laser is frequency modulated at a second-modulation frequency to form a second-frequency-modulated optical beam. A center frequency of the first-frequency-modulated optical beam is offset from a center frequency of the second-frequency-modulated optical beam. In one implementation of this embodiment, the center frequency $(f_1-\Delta f-FSR)$ of the first-frequency-modulated optical beam 311-1 is offset from a center frequency $f_1$ of the second-frequency-modulated optical beam 311-2 by $\Delta f-FSR$ (FIG. 3). In another implementation of this embodiment, the center frequency $f_1$ of the first-frequency-modulated optical beam 307-1 is offset from a center frequency $f_2$ of the second-frequency-modulated optical beam 307-2 by $\Delta f-FSR$ (FIG. 1). The first-modulation frequency and the second-modulation frequency are adjusted with respect to each other so that sideband noise spectrum, on the optical beam output from the fiber resonator, centered on the first-modulation frequency of the first-frequency-modulated-optical-beam is offset in frequency from the second-modulation frequency of the second-frequency-modulated-optical-beam, and sideband noise spectrum, on the optical beam output from the fiber resonator, centered on the second-modulation frequency of second-frequency-modulated-optical-beam is offset from the first-modulation frequency of the first-frequency-modulated-optical-beam.

At block 406, the first-frequency-modulated optical beam is input at a counter-clockwise-input end of a fiber resonator. In this manner, the first-frequency-modulated optical beam is optically coupled into the fiber resonator so the first-frequency-modulated optical beam propagates in the fiber resonator in the counter-clockwise direction. Prior to inputting the first-frequency-modulated optical beam to the counter-clockwise-input end of the fiber resonator, the first-frequency-modulated optical beam is input to a first intensity modulator 320-1. The first intensity modulator 320-1 outputs a first-low-noise-coherent optical beam 310-1 to the counter-clockwise-input end 241 of the fiber resonator coil 240. The intensity noise of the first-low-noise-coherent optical beam that is being input to the counter-clockwise-input end 241 of the fiber resonator coil 240 is measured and the light intensity of the first-frequency-modulated optical beam 307-1 passing through the first intensity modulator 320-1 is adjusted by providing feedback to a first-relative-intensity-noise servo 256. The feedback is based on the measured intensity noise of the first-low-noise-coherent optical beam 310-1. The first-relative-intensity-noise servo 256 is configured to remove frequencies at, or within 5 kHz of: the first-modulation frequency; the second-modulation frequency; the first several odd harmonics of the first-modulation frequency; and the first several odd harmonics of the second-modulation frequency. In one implementation of this embodiment, first-relative-intensity-noise servo 256 is configured to remove frequencies from DC to 5 kHz. In another implementation of this embodiment, first-relative-intensity-noise servo 256 is configured to remove frequencies from DC to less than 5 kHz. In yet another implementation of this embodiment, first-relative-intensity-noise servo 256 is configured to remove frequencies from DC to about 7 kHz.

At block 408, the second-frequency-modulated optical beam 307-2 is input at a clockwise-input end 242 of the fiber resonator coil 240. In this manner, the second-frequency-modulated optical beam 310-2 is optically coupled into the fiber resonator coil 240 so the second-frequency-modulated optical beam propagates in the fiber resonator coil 240 in the clockwise direction.

Prior to inputting the second-frequency-modulated optical beam 310-2 to the counter-clockwise-input end 242 of the fiber resonator coil 240, the second-frequency-modulated optical beam 307-2 is input to a second intensity modulator 320-2. The second intensity modulator 320-2 outputs a second-low-noise-coherent optical beam 310-2 to the clockwise-input end 242 of the fiber resonator coil 240. The intensity noise of the second-low-noise-coherent optical beam 310-2 that is being input to the clockwise-input end 242 of the fiber resonator coil 240 is measured and light intensity of the second-frequency-modulated optical beam 310-2 passing through the second intensity modulator 307-2 is adjusted by providing feedback to a second-relative-intensity-noise servo 253. The feedback is based on the measured intensity noise of the second-low-noise-coherent optical beam 310-2. The second-relative-intensity-noise servo 253 is configured to remove frequencies at, or within 5 kHz of: the first-modulation frequency; the second-modulation frequency; the first several odd harmonics of the first-modulation frequency; and the first several odd harmonics of the second-modulation frequency. In one implementation of this embodiment, the second-relative-intensity-noise servo 253 is configured to remove frequencies from DC to 5 kHz.

In one implementation of this embodiment, there is a third optical beam 308-3 output from at least one laser 200. The third optical beam 308-3 is frequency modulated at a third-modulation frequency $f_p$ to form a third-frequency-modulated optical beam 307-3. The third-frequency-modulated optical beam 307-3 (after passing through the intensity modulator 320-3) is input at the counter-clockwise-input end 241 of the fiber resonator 60. The optical beam output from the clockwise-input end of the fiber resonator 60 is demodulated at the third-demodulation frequency $f_p$. In this case, the first-modulation frequency $f_m$, the second-modulation frequency $f_n$, and the third-modulation frequency $f_p$ are adjusted are adjusted with respect to each other so that: 1) sideband noise spectrum, on the optical beam output from the fiber resonator 60, centered on the first-modulation frequency $f_m$ of the firstfrequency-modulated-optical-beam 307-1 is offset in frequency from the third-modulation frequency $f_p$ of the third-frequency-modulated-optical-beam 307-3; 2) sideband noise spectrum, on the optical beam output from the fiber resonator 60, centered on the third-modulation frequency $f_p$ of third-frequency-modulated-optical-beam 307-3 is offset from the first-modulation frequency $f_m$ of the first-frequency-modulated-optical-beam 307-1; 3) sideband noise spectrum, on the optical beam output from the fiber resonator, centered on the second-modulation frequency $f_n$ of the second-frequency-modulated-optical-beam 307-2 is offset in frequency from the third-modulation frequency $f_p$ of the third-frequency-modulated-optical-beam 307-3; and 4) sideband noise spectrum, on the optical beam output from the fiber resonator, centered on the third-modulation frequency $f_p$ of third-frequency-modulated-optical-beam 307-3 is offset from the second-modulation frequency $f_n$ of the second-frequency-modulated-optical-beam 307-2.

At block 410, an optical beam output from the clockwise-input end of the fiber resonator is demodulated at a first-demodulation frequency.

At block 412, an optical beam output from the counter-clockwise-input end of the fiber resonator is demodulated at a second-demodulation frequency. The first-modulation frequency and the second-modulation frequency are adjusted with respect to each other so that sideband noise spectrum centered on the first-modulation frequency of the first-frequency-modulated-optical-beam is offset in frequency from the second-modulation frequency of the second-frequency-modulated-optical-beam and so that the sideband noise spectrum centered on the second-modulation frequency of second-frequency-modulated-optical-beam is offset from the first-modulation frequency of the first-frequency-modulated-optical-beam. The first-demodulation frequency equals the first-modulation frequency. The second-demodulation frequency equals the second-modulation frequency.

It is to be understood, that, the FSR optical beam frequency shift components in optical beams 307-1, 307-3, 311-1, 311-3 may be generalized to m times the FSR (where m is an integer) instead of using m=1 as described above with reference to FIGS. 1 and 3.

Example Embodiments

Example 1 includes a low-noise resonator fiber-optic gyroscope, comprising: at least one laser configured to output a reference optical beam used to form at least a first optical beam and a second optical beam; a first-optical-beam frequency controller to modulate the first optical beam at a first-modulation frequency to form a first-frequency-modulated optical beam; a second-optical-beam frequency controller to modulate the second optical beam at a second-modulation frequency to form a second-frequency-modulated optical beam, wherein at least one of the first-frequency-modulated optical beam and the second-frequency-modulated optical beam is frequency-shifted from the reference optical beam; a fiber resonator having a fiber resonator coil with a clockwise-input end and a counter-clockwise-input end, the counter-clockwise-input end configured to input the first-frequency-modulated optical beam and the clockwise-input end configured to input the second-frequency-modulated optical beam; a first-frequency demodulator to demodulate, at a first-demodulation frequency, an optical beam output from the clockwise-input end of the fiber resonator; and a second-frequency demodulator to demodulate, at a second-demodulation frequency, an optical beam output from the counter-clockwise-input end of the fiber resonator, wherein the first-demodulation frequency equals the first-modulation frequency and the second-demodulation frequency equals the second-modulation frequency, and wherein the first-modulation frequency and the second-modulation frequency are adjusted with respect to each other so that, on the optical beams output from the fiber resonator: sideband noise spectrum centered on the first-modulation frequency is offset in frequency from the second-modulation frequency, and sideband noise spectrum centered on the second-modulation frequency is offset from the first-modulation frequency.

Example 2 includes the resonator fiber-optic gyroscope of Example 1, further comprising: a first-relative-intensity-noise servo positioned at the counter-clockwise-input end of the fiber resonator coil to reduce amplitude noise in the first-frequency-modulated optical beam; and a second-relative-intensity-noise servo positioned at the clockwise-input end of the fiber resonator coil to reduce amplitude noise in the second-frequency-modulated optical beam.

Example 3 includes the resonator fiber-optic gyroscope of any of Examples 1-2, wherein the first-relative-intensity-noise servo and second-relative-intensity-noise servo are configured to remove intensity fluctuations at frequencies at, and around: the first-modulation frequency; the second-modulation frequency; first several odd harmonics of the first-modulation frequency; and first several odd harmonics of the second-modulation frequency.

Example 4 includes the resonator fiber-optic gyroscope of any of Examples 1-3, wherein the first-relative-intensity-noise servo and second-relative-intensity-noise servo are further configured to remove intensity fluctuations at frequencies from DC to 5 kHz.

Example 5 includes the resonator fiber-optic gyroscope of any of Examples 1-4, wherein the reference optical beam is used to form a third optical beam, the resonator fiber-optic gyroscope further comprising: a third-optical-beam frequency controller to modulate the third optical beam at a third-modulation frequency to form a third-frequency-modulated optical beam; a third-frequency demodulator to demodulate, at a third-demodulation frequency, the optical beam output from the clockwise-input end of the fiber resonator; and a third-relative-intensity-noise servo positioned at the counter-clockwise-input end of the fiber resonator coil to reduce amplitude noise in the third-frequency-modulated optical beam, wherein the first-relative-intensity-noise servo, the second-relative-intensity-noise servo, and the third-relative-intensity-noise servo are configured to remove intensity fluctuations at frequencies at, and around: the first-modulation frequency; the second-modulation frequency; the third-modulation frequency; first several odd harmonics of the first-modulation frequency; first several odd harmonics of the second-modulation frequency; and first several odd harmonics of the third-modulation frequency.

Example 6 includes the resonator fiber-optic gyroscope of any of Examples 1-5, wherein the first-relative-intensity-noise servo, the second-relative-intensity-noise servo, and the third-relative-intensity-noise servo are configured to remove intensity fluctuations at frequencies from DC to 5 kHz.

Example 7 includes the resonator fiber-optic gyroscope of any of Examples 1-6, wherein the at least one laser includes at least: a frequency stabilized master laser having a master-laser frequency; a first slave laser configured to emit the first-frequency-modulated optical beam, wherein the first-frequency-modulated optical beam has a first frequency, which is locked to and shifted from the master-laser frequency; a second slave laser configured to emit the second-frequency-modulated optical beam, wherein the second-frequency-modulated optical beam has a second frequency, which is locked to and shifted from the master-laser frequency; and a third slave laser configured to emit the third-frequency-modulated optical beam, wherein the third-frequency-modulated optical beam has a third frequency, which is locked to and shifted from the master-laser frequency.

Example 8 includes the resonator fiber-optic gyroscope of any of Examples 1-6, wherein the at least one laser includes at least: a frequency stabilized master laser having a master-laser frequency; a first slave laser configured to emit the first-frequency-modulated optical beam, wherein the first-frequency-modulated optical beam has a first frequency, which is locked to and shifted from the master-laser frequency; and a second slave laser configured to emit the second-frequency-modulated optical beam, wherein the second-frequency-modulated optical beam has a second frequency, which is locked to and shifted from the master-laser frequency.

Example 9 includes the resonator fiber-optic gyroscope of any of Examples 1-6, wherein the at least one laser comprises: a laser emitting the reference optical beam, wherein the reference optical beam is split into a first optical beam, a second optical beam, and a third optical beam, and wherein the gyroscope further comprises: a frequency down-shifter to downshift the first optical beam by a free spectral range of the fiber resonator, the output of the frequency down-shifter being input to the first-optical-beam frequency controller configured to modulate the downshifted-first optical beam, wherein the modulated-downshifted-first optical beam is input to the counter-clockwise-input end of the fiber resonator, wherein the second optical beam is input to the second-optical-beam frequency controller configured to modulate the second optical beam, wherein the modulated-second optical beam is input to the clockwise-input end of the fiber resonator; and a frequency up-shifter to upshift the third optical beam by the free spectral range of the fiber resonator, the output of the frequency up-shifter being input to a third-optical-beam frequency controller configured to modulate the upshifted third optical beam at a third-modulation frequency to form a modulated-upshifted-third optical beam, wherein the modulated-upshifted-third optical beam is input to the counter-clockwise-input end of the fiber resonator.

Example 10 includes the resonator fiber-optic gyroscope of Example 9, further comprising: a first channel resonance tracking servo to receive an error signal from the first-frequency demodulator and to output a first correction signal to the frequency down-shifter; and a second channel resonance tracking servo to receive an error signal from the second-frequency demodulator and to output a second correction signal to the laser emitting the reference optical beam; and a third channel resonance tracking servo to receive an error signal from a third-frequency demodulator and to output a third correction signal to the frequency up-shifter.

Example 11 includes the resonator fiber-optic gyroscope of any of Examples 1-10, further comprising: a first channel resonance tracking servo to receive an error signal from the first-frequency demodulator and to output a first correction signal to the first-frequency-modulated optical beam; and a second channel resonance tracking servo to receive an error signal from the second-frequency demodulator and to output a second correction signal to the second-frequency-modulated optical beam.

Example 12 is a method to reduce gyro angle random walk of a resonator fiber-optic gyroscope, the method comprising: frequency modulating at a first-modulation frequency a first optical beam output from at least one laser to form a first-frequency-modulated optical beam; frequency modulating at a second-modulation frequency a second optical beam output from the at least one laser to form a second-frequency-modulated optical beam, wherein a center frequency of the first-frequency-modulated optical beam is offset from a center frequency of the second-frequency-modulated optical beam; inputting the first-frequency-modulated optical beam at a counter-clockwise-input end of a fiber resonator; inputting the second-frequency-modulated optical beam at a clockwise-input end of the fiber resonator; demodulating at a first-demodulation frequency an optical beam output from the clockwise-input end of the fiber resonator; and demodulating at a second-demodulation frequency an optical beam output from the counter-clockwise-input end of the fiber resonator, wherein the first-modulation frequency and the second-modulation frequency are adjusted with respect to each other so that, on the optical beams output from the fiber resonator: sideband noise spectrum centered on the first-modulation frequency is offset in frequency from the second-modulation frequency, and sideband noise spectrum centered on the second-modulation frequency is offset from the first-modulation frequency.

Example 13 includes the method of Example 12, further comprising: inputting the first-frequency-modulated optical beam to a first intensity modulator; outputting a first-low-noise-coherent optical beam from the first intensity modulator to the counter-clockwise-input end of the fiber resonator coil; measuring intensity noise of the first-low-noise-coherent optical beam that is being input to the counter-clockwise-input end of the fiber resonator coil; and adjusting light intensity of the first-frequency-modulated optical beam passing through the first intensity modulator by providing feedback to a first-relative-intensity-noise servo, the feedback being based on the measured intensity noise of the first-low-noise-coherent optical beam.

Example 14 includes the method of any of Examples 12-13, further comprising: inputting the second-frequency-modulated optical beam to a second intensity modulator; outputting a second-low-noise-coherent optical beam from the second intensity modulator to the clockwise-input end of the fiber resonator coil; measuring intensity noise of the second-low-noise-coherent optical beam that is being input to the clockwise-input end of the fiber resonator coil; and adjusting light intensity of the second-frequency-modulated optical beam passing through the second intensity modulator by providing feedback to a second-relative-intensity-noise servo, the feedback being based on the measured intensity noise of the second-low-noise-coherent optical beam, wherein the first-relative-intensity-noise servo and the second-relative-intensity-noise servo are configured to remove intensity fluctuations at frequencies at, and around: the first-modulation frequency; the second-modulation frequency; first several odd harmonics of the first-modulation frequency; first several odd harmonics of the second-modulation frequency; and DC to 5 kHz.

Example 15 includes the method of any of Examples 12-14 further comprising: frequency modulating at a third-modulation frequency a third optical beam output from at least one laser to form a third-frequency-modulated optical beam; inputting the third-frequency-modulated optical beam at the counter-clockwise-input end of the fiber resonator; and demodulating at a third-demodulation frequency the optical beam output from the clockwise-input end of the fiber resonator, wherein the first-modulation frequency, the second-modulation frequency, and the third-modulation frequency are adjusted are adjusted with respect to each other so that, on the optical beams output from the fiber resonator: sideband noise spectrum centered on the first-modulation is offset in frequency from the third-modulation frequency, sideband noise spectrum centered on the third-modulation frequency is offset from the first-modulation frequency, sideband noise spectrum centered on the second-modulation frequency is offset in frequency from the third-modulation, and sideband noise spectrum centered on the third-modulation frequency is offset from the second-modulation frequency.

Example 16 includes the method of any of Examples 12-15, further comprising: inputting the third-frequency-modulated optical beam to a third intensity modulator; outputting a third-low-noise-coherent optical beam from the third intensity modulator to the counter-clockwise-input end of the fiber resonator coil; measuring intensity noise of the third-low-noise-coherent optical beam that is being input to the counter-clockwise-input end of the fiber resonator coil; and adjusting light intensity of the third-frequency-modulated optical beam passing through the third intensity modulator by providing feedback to a third-relative-intensity-noise servo, the feedback being based on the measured intensity noise of the third-low-noise-coherent optical beam, wherein the first-relative-intensity-noise servo, the second-relative-intensity-noise servo, and the third-relative-intensity-noise servo are configured to remove intensity fluctuations at frequencies at, and around: the first-modulation frequency; the second-modulation frequency; the third-modulation frequency; first several odd harmonics of the first-modulation frequency; first several odd harmonics of the second-modulation frequency; first several odd harmonics of the third-modulation frequency; and DC to 5 kHz.

Example 17 includes the method of any of Examples 12-16, further comprising: frequency modulating at a third-modulation frequency a third optical beam output from at least one laser to form a third-frequency-modulated optical beam; inputting the third-frequency-modulated optical beam at the counter-clockwise-input end of the fiber resonator; and demodulating, at a third-demodulation frequency, the optical beam output from the clockwise-input end of the fiber resonator, wherein the first-modulation frequency, the second-modulation frequency, and the third-modulation frequency are adjusted are adjusted with respect to each other so that, on the optical beams output from the fiber resonator: sideband noise spectrum centered on the first-modulation frequency is offset in frequency from the third-modulation frequency, sideband noise spectrum centered on the third-modulation frequency is offset from the first-modulation frequency, sideband noise spectrum centered on the second-modulation frequency is offset in frequency from the third-modulation frequency, and sideband noise spectrum centered on the third-modulation frequency is offset from the second-modulation frequency.

Example 18 includes a low-noise-resonator fiber-optic gyroscope, comprising: at least one laser configured to output a reference optical beam used to form at least a first optical beam and a second optical beam; a first-optical-beam frequency controller to modulate the first optical beam at a first-modulation frequency to form a first-frequency-modulated optical beam; a second-optical-beam frequency controller to modulate the second optical beam at a second-modulation frequency to form a second-frequency-modulated optical, wherein at least one of the first-frequency-modulated optical beam and the second-frequency-modulated optical beam is frequency-shifted from the reference optical beam; a fiber resonator having a fiber resonator coil with a clockwise-input end and a counter-clockwise-input end, the counter-clockwise-input end configured to input the first-frequency-modulated optical beam and the clockwise-input end configured to input the second-frequency-modulated optical beam; a first-relative-intensity-noise servo positioned at the counter-clockwise-input end of the fiber resonator coil to reduce amplitude noise in the first-frequency-modulated optical beam; and a second-relative-intensity-noise servo positioned at the clockwise-input end of the fiber resonator coil to reduce amplitude noise in the second-frequency-modulated optical beam, the first-relative-intensity-noise servo and second-relative-intensity-noise servo configured to remove intensity fluctuations at frequencies at, and around: the first-modulation frequency; the second-modulation frequency; first several odd harmonics of the first-modulation frequency; first several odd harmonics of the second-modulation frequency; and DC to 5 kHz.

Example 19 includes a low-noise-resonator fiber-optic gyroscope of Example 18, further comprising: a first-frequency demodulator to demodulate, at a first-demodulation frequency, an optical beam output from the clockwise-input end of the fiber resonator; and a second-frequency demodulator to demodulate, at a second-demodulation frequency, an optical beam output from the counter-clockwise-input end of the fiber resonator, wherein the first-demodulation frequency equals the first-modulation frequency and the second-demodulation frequency equals the second-modulation frequency, and wherein the first-modulation frequency and the second-modulation frequency are adjusted with respect to each other so that, on the optical beams output from the fiber resonator: sideband noise spectrum centered on the first-modulation frequency is offset in frequency from the second-modulation frequency, and sideband noise spectrum centered on the second-modulation frequency is offset from the first-modulation frequency.

Example 20 includes a low-noise-resonator fiber-optic gyroscope of any of Examples 18-19, further comprising: a first channel resonance tracking servo to receive an error signal from the first-frequency demodulator and to output a first correction signal to one of: a frequency down-shifter, or the first-optical-beam frequency controller; and a second channel resonance tracking servo to receive an error signal from the second-frequency demodulator and to output a second correction signal to one of: the at least one laser configured to output the reference optical beam, or the second-optical-beam frequency controller.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A low-noise resonator fiber-optic gyroscope, comprising:
   at least one laser configured to output a reference optical beam used to form at least a first optical beam and a second optical beam;
   a first-optical-beam frequency controller to modulate the first optical beam at a first-modulation frequency to form a first-frequency-modulated optical beam;
   a second-optical-beam frequency controller to modulate the second optical beam at a second-modulation frequency to form a second-frequency-modulated optical beam, wherein at least one of the first-frequency-modulated optical beam and the second-frequency-modulated optical beam is frequency-shifted from the reference optical beam;
   a fiber resonator having a fiber resonator coil with a clockwise-input end and a counter-clockwise-input end, the counter-clockwise-input end configured to input the first-frequency-modulated optical beam and the clockwise-input end configured to input the second-frequency-modulated optical beam;
a first-frequency demodulator to demodulate, at a first-demodulation frequency, an optical beam output from the clockwise-input end of the fiber resonator; and
a second-frequency demodulator to demodulate, at a second-demodulation frequency, an optical beam output from the counter-clockwise-input end of the fiber resonator, wherein the first-demodulation frequency equals the first-modulation frequency and the second-demodulation frequency equals the second-modulation frequency, and wherein the first-modulation frequency and the second-modulation frequency are adjusted with respect to each other so that, on the optical beams output from the fiber resonator:
sideband noise spectrum centered on the first-modulation frequency is offset in frequency from the second-modulation frequency, and
sideband noise spectrum centered on the second-modulation frequency is offset from the first-modulation frequency.

2. The resonator fiber-optic gyroscope of claim 1, further comprising:
a first-relative-intensity-noise servo positioned at the counter-clockwise-input end of the fiber resonator coil to reduce amplitude noise in the first-frequency-modulated optical beam; and
a second-relative-intensity-noise servo positioned at the clockwise-input end of the fiber resonator coil to reduce amplitude noise in the second-frequency-modulated optical beam.

3. The resonator fiber-optic gyroscope of claim 2, wherein the first-relative-intensity-noise servo and second-relative-intensity-noise servo are configured to remove intensity fluctuations at frequencies at, and around:
the first-modulation frequency;
the second-modulation frequency;
first several odd harmonics of the first-modulation frequency; and
first several odd harmonics of the second-modulation frequency.

4. The resonator fiber-optic gyroscope of claim 3, wherein the first-relative-intensity-noise servo and second-relative-intensity-noise servo are further configured to remove intensity fluctuations at frequencies from DC to 5 kHz.

5. The resonator fiber-optic gyroscope of claim 2, wherein the reference optical beam is used to form a third optical beam, the resonator fiber-optic gyroscope further comprising:
a third-optical-beam frequency controller to modulate the third optical beam at a third-modulation frequency to form a third-frequency-modulated optical beam;
a third-frequency demodulator to demodulate, at a third-demodulation frequency, the optical beam output from the clockwise-input end of the fiber resonator; and
a third-relative-intensity-noise servo positioned at the counter-clockwise-input end of the fiber resonator coil to reduce amplitude noise in the third-frequency-modulated optical beam, wherein the first-relative-intensity-noise servo, the second-relative-intensity-noise servo, and the third-relative-intensity-noise servo are configured to remove intensity fluctuations at frequencies at, and around:
the first-modulation frequency;
the second-modulation frequency;
the third-modulation frequency;
first several odd harmonics of the first-modulation frequency;
first several odd harmonics of the second-modulation frequency; and
first several odd harmonics of the third-modulation frequency.

6. The gyroscope of claim 5, wherein the first-relative-intensity-noise servo, the second-relative-intensity-noise servo, and the third-relative-intensity-noise servo are configured to remove intensity fluctuations at frequencies from DC to 5 kHz.

7. The resonator fiber-optic gyroscope of claim 5, wherein the at least one laser includes at least:
a frequency stabilized master laser having a master-laser frequency;
a first slave laser configured to emit the first-frequency-modulated optical beam, wherein the first-frequency-modulated optical beam has a first frequency, which is locked to and shifted from the master-laser frequency;
a second slave laser configured to emit the second-frequency-modulated optical beam, wherein the second-frequency-modulated optical beam has a second frequency, which is locked to and shifted from the master-laser frequency; and
a third slave laser configured to emit the third-frequency-modulated optical beam, wherein the third-frequency-modulated optical beam has a third frequency, which is locked to and shifted from the master-laser frequency.

8. The resonator fiber-optic gyroscope of claim 1, wherein the at least one laser includes at least:
a frequency stabilized master laser having a master-laser frequency;
a first slave laser configured to emit the first-frequency-modulated optical beam, wherein the first-frequency-modulated optical beam has a first frequency, which is locked to and shifted from the master-laser frequency; and
a second slave laser configured to emit the second-frequency-modulated optical beam, wherein the second-frequency-modulated optical beam has a second frequency, which is locked to and shifted from the master-laser frequency.

9. The resonator fiber-optic gyroscope of claim 1, wherein the at least one laser comprises:
a laser emitting the reference optical beam, wherein the reference optical beam is split into a first optical beam, a second optical beam, and a third optical beam, and wherein the gyroscope further comprises:
a frequency down-shifter to downshift the first optical beam by a free spectral range of the fiber resonator, the output of the frequency down-shifter being input to the first-optical-beam frequency controller configured to modulate the downshifted-first optical beam, wherein the modulated-downshifted-first optical beam is input to the counter-clockwise-input end of the fiber resonator,
wherein the second optical beam is input to the second-optical-beam frequency controller configured to modulate the second optical beam, wherein the modulated-second optical beam is input to the clockwise-input end of the fiber resonator; and
a frequency up-shifter to upshift the third optical beam by the free spectral range of the fiber resonator, the output of the frequency up-shifter being input to a third-optical-beam frequency controller configured to modulate the upshifted third optical beam at a third-modulation frequency to form a modulated-upshifted-third optical beam, wherein the modulated-upshifted-third optical beam is input to the counter-clockwise-input end of the fiber resonator.

10. The resonator fiber-optic gyroscope of claim 9, further comprising:
a first channel resonance tracking servo to receive an error signal from the first-frequency demodulator and to output a first correction signal to the frequency downshifter; and
a second channel resonance tracking servo to receive an error signal from the second-frequency demodulator and to output a second correction signal to the laser emitting the reference optical beam; and
a third channel resonance tracking servo to receive an error signal from a third-frequency demodulator and to output a third correction signal to the frequency up-shifter.

11. The resonator fiber-optic gyroscope of claim 1, further comprising:
a first channel resonance tracking servo to receive an error signal from the first-frequency demodulator and to output a first correction signal to the first-frequency-modulated optical beam; and
a second channel resonance tracking servo to receive an error signal from the second-frequency demodulator and to output a second correction signal to the second-frequency-modulated optical beam.

12. A method to reduce gyro angle random walk of a resonator fiber-optic gyroscope, the method comprising:
frequency modulating at a first-modulation frequency a first optical beam output from at least one laser to form a first-frequency-modulated optical beam;
frequency modulating at a second-modulation frequency a second optical beam output from the at least one laser to form a second-frequency-modulated optical beam, wherein a center frequency of the first-frequency-modulated optical beam is offset from a center frequency of the second-frequency-modulated optical beam;
inputting the first-frequency-modulated optical beam at a counter-clockwise-input end of a fiber resonator;
inputting the second-frequency-modulated optical beam at a clockwise-input end of the fiber resonator;
demodulating at a first-demodulation frequency an optical beam output from the clockwise-input end of the fiber resonator; and
demodulating at a second-demodulation frequency an optical beam output from the counter-clockwise-input end of the fiber resonator, wherein the first-modulation frequency and the second-modulation frequency are adjusted with respect to each other so that, on the optical beams output from the fiber resonator:
sideband noise spectrum centered on the first-modulation frequency is offset in frequency from the second-modulation frequency, and
sideband noise spectrum centered on the second-modulation frequency is offset from the first-modulation frequency.

13. The method of claim 12, further comprising:
inputting the first-frequency-modulated optical beam to a first intensity modulator;
outputting a first-low-noise-coherent optical beam from the first intensity modulator to the counter-clockwise-input end of the fiber resonator coil;
measuring intensity noise of the first-low-noise-coherent optical beam that is being input to the counter-clockwise-input end of the fiber resonator coil; and
adjusting light intensity of the first-frequency-modulated optical beam passing through the first intensity modulator by providing feedback to a first-relative-intensity-noise servo, the feedback being based on the measured intensity noise of the first-low-noise-coherent optical beam.

14. The method of claim 13, further comprising:
inputting the second-frequency-modulated optical beam to a second intensity modulator;
outputting a second-low-noise-coherent optical beam from the second intensity modulator to the clockwise-input end of the fiber resonator coil;
measuring intensity noise of the second-low-noise-coherent optical beam that is being input to the clockwise-input end of the fiber resonator coil; and
adjusting light intensity of the second-frequency-modulated optical beam passing through the second intensity modulator by providing feedback to a second-relative-intensity-noise servo, the feedback being based on the measured intensity noise of the second-low-noise-coherent optical beam, wherein the first-relative-intensity-noise servo and the second-relative-intensity-noise servo are configured to remove intensity fluctuations at frequencies at, and around:
the first-modulation frequency;
the second-modulation frequency;
first several odd harmonics of the first-modulation frequency;
first several odd harmonics of the second-modulation frequency; and
DC to 5 kHz.

15. The method of claim 14, further comprising:
frequency modulating at a third-modulation frequency a third optical beam output from at least one laser to form a third-frequency-modulated optical beam;
inputting the third-frequency-modulated optical beam at the counter-clockwise-input end of the fiber resonator; and
demodulating at a third-demodulation frequency the optical beam output from the clockwise-input end of the fiber resonator,
wherein the first-modulation frequency, the second-modulation frequency, and the third-modulation frequency are adjusted are adjusted with respect to each other so that, on the optical beams output from the fiber resonator:
sideband noise spectrum centered on the first-modulation is offset in frequency from the third-modulation frequency,
sideband noise spectrum centered on the third-modulation frequency is offset from the first-modulation frequency,
sideband noise spectrum centered on the second-modulation frequency is offset in frequency from the third-modulation, and
sideband noise spectrum centered on the third-modulation frequency is offset from the second-modulation frequency.

16. The method of claim 15, further comprising:
inputting the third-frequency-modulated optical beam to a third intensity modulator;
outputting a third-low-noise-coherent optical beam from the third intensity modulator to the counter-clockwise-input end of the fiber resonator coil;
measuring intensity noise of the third-low-noise-coherent optical beam that is being input to the counter-clockwise-input end of the fiber resonator coil; and
adjusting light intensity of the third-frequency-modulated optical beam passing through the third intensity modulator by providing feedback to a third-relative-intensity-noise servo, the feedback being based on the measured intensity noise of the third-low-noise-coherent optical beam, wherein the first-relative-intensity-noise servo, the second-relative-intensity-noise servo, and the third-relative-intensity-noise servo are configured to remove intensity fluctuations at frequencies at, and around:
the first-modulation frequency;
the second-modulation frequency;
the third-modulation frequency;
first several odd harmonics of the first-modulation frequency;
first several odd harmonics of the second-modulation frequency;
first several odd harmonics of the third-modulation frequency; and
DC to 5 kHz.

17. The method of claim 12, further comprising:
frequency modulating at a third-modulation frequency a third optical beam output from at least one laser to form a third-frequency-modulated optical beam;
inputting the third-frequency-modulated optical beam at the counter-clockwise-input end of the fiber resonator; and
demodulating, at a third-demodulation frequency, the optical beam output from the clockwise-input end of the fiber resonator, wherein the first-modulation frequency, the second-modulation frequency, and the third-modulation frequency are adjusted are adjusted with respect to each other so that, on the optical beams output from the fiber resonator:
sideband noise spectrum centered on the first-modulation frequency is offset in frequency from the third-modulation frequency,
sideband noise spectrum centered on the third-modulation frequency is offset from the first-modulation frequency,
sideband noise spectrum centered on the second-modulation frequency is offset in frequency from the third-modulation frequency, and
sideband noise spectrum centered on the third-modulation frequency is offset from the second-modulation frequency.

18. A low-noise-resonator fiber-optic gyroscope, comprising:
at least one laser configured to output a reference optical beam used to form at least a first optical beam and a second optical beam;
a first-optical-beam frequency controller to modulate the first optical beam at a first-modulation frequency to form a first-frequency-modulated optical beam;
a second-optical-beam frequency controller to modulate the second optical beam at a second-modulation frequency to form a second-frequency-modulated optical, wherein at least one of the first-frequency-modulated optical beam and the second-frequency-modulated optical beam is frequency-shifted from the reference optical beam;
a fiber resonator having a fiber resonator coil with a clockwise-input end and a counter-clockwise-input end, the counter-clockwise-input end configured to input the first-frequency-modulated optical beam and the clockwise-input end configured to input the second-frequency-modulated optical beam;
a first-relative-intensity-noise servo positioned at the counter-clockwise-input end of the fiber resonator coil to reduce amplitude noise in the first-frequency-modulated optical beam; and
a second-relative-intensity-noise servo positioned at the clockwise-input end of the fiber resonator coil to reduce amplitude noise in the second-frequency-modulated optical beam, the first-relative-intensity-noise servo and second-relative-intensity-noise servo configured to remove intensity fluctuations at frequencies at, and around:
the first-modulation frequency;
the second-modulation frequency;
first several odd harmonics of the first-modulation frequency;
first several odd harmonics of the second-modulation frequency; and
DC to 5 kHz.

19. The resonator fiber-optic gyroscope of claim 18, further comprising:
a first-frequency demodulator to demodulate, at a first-demodulation frequency, an optical beam output from the clockwise-input end of the fiber resonator; and
a second-frequency demodulator to demodulate, at a second-demodulation frequency, an optical beam output from the counter-clockwise-input end of the fiber resonator, wherein the first-demodulation frequency equals the first-modulation frequency and the second-demodulation frequency equals the second-modulation frequency, and wherein the first-modulation frequency and the second-modulation frequency are adjusted with respect to each other so that, on the optical beams output from the fiber resonator:
sideband noise spectrum centered on the first-modulation frequency is offset in frequency from the second-modulation frequency, and
sideband noise spectrum centered on the second-modulation frequency is offset from the first-modulation frequency.

20. The resonator fiber-optic gyroscope of claim 19, further comprising:
a first channel resonance tracking servo to receive an error signal from the first-frequency demodulator and to output a first correction signal to one of: a frequency downshifter, or the first-optical-beam frequency controller; and
a second channel resonance tracking servo to receive an error signal from the second-frequency demodulator and to output a second correction signal to one of: the at least one laser configured to output the reference optical beam, or the second-optical-beam frequency controller.

* * * * *